United States Patent [19]

Walker et al.

[11] 4,093,847
[45] June 6, 1978

[54] TEMPERATURE CONTROL SYSTEM FOR ELECTRIC FLUID HEATER

[75] Inventors: John A. Walker; Dimitri S. Dimitri, both of Northridge, Calif.

[73] Assignee: Datametrics Corporation, Van Nuys, Calif.

[21] Appl. No.: 668,470

[22] Filed: Mar. 19, 1976

Related U.S. Application Data

[62] Division of Ser. No. 504,84, Sep. 10, 1974, Pat. No. 3,983,559, which is a division of Ser. No. 385,275, Aug. 3, 1973, Pat. No. 3,909,588.

[51] Int. Cl.² .......................... H05B 1/02; H05B 3/60
[52] U.S. Cl. .................................. 219/501; 219/295; 219/331
[58] Field of Search .............. 219/288, 290, 308, 331, 219/485, 501, 295

[56] References Cited

U.S. PATENT DOCUMENTS

| | | | |
|---|---|---|---|
| 2,465,532 | 3/1949 | Hall | 219/295 |
| 3,517,162 | 6/1970 | Webb | 219/331 |

*Primary Examiner*—J. V. Truhe
*Assistant Examiner*—Fred E. Bell
*Attorney, Agent, or Firm*—Kleinberg, Morganstern, Scholnick & Mann

[57] ABSTRACT

An electric fluid heater of the type in which the fluid is heated by passing electricity through it includes an electronic temperature control system responsive to a temperature sensor in the fluid for controlling the flow of electric current to the heating electrodes. The electronic controller includes means to limit the maximum current passed by the heating electrodes. Heat generated is controlled to demand by varying the duty cycle of back-to-back SCR's in series with one of the electrodes.

7 Claims, 6 Drawing Figures

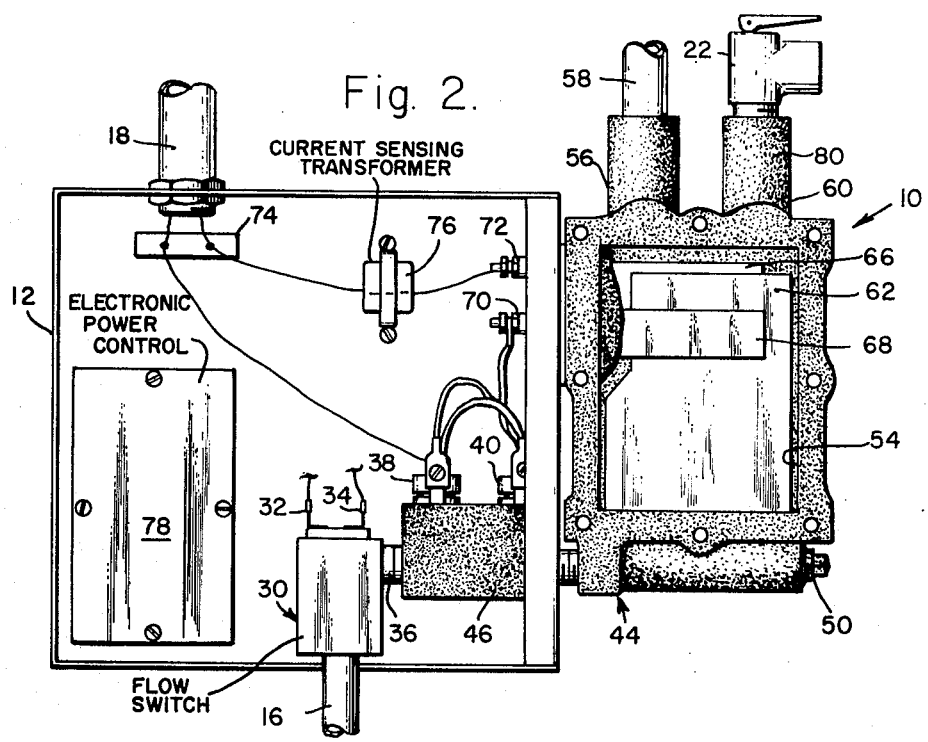
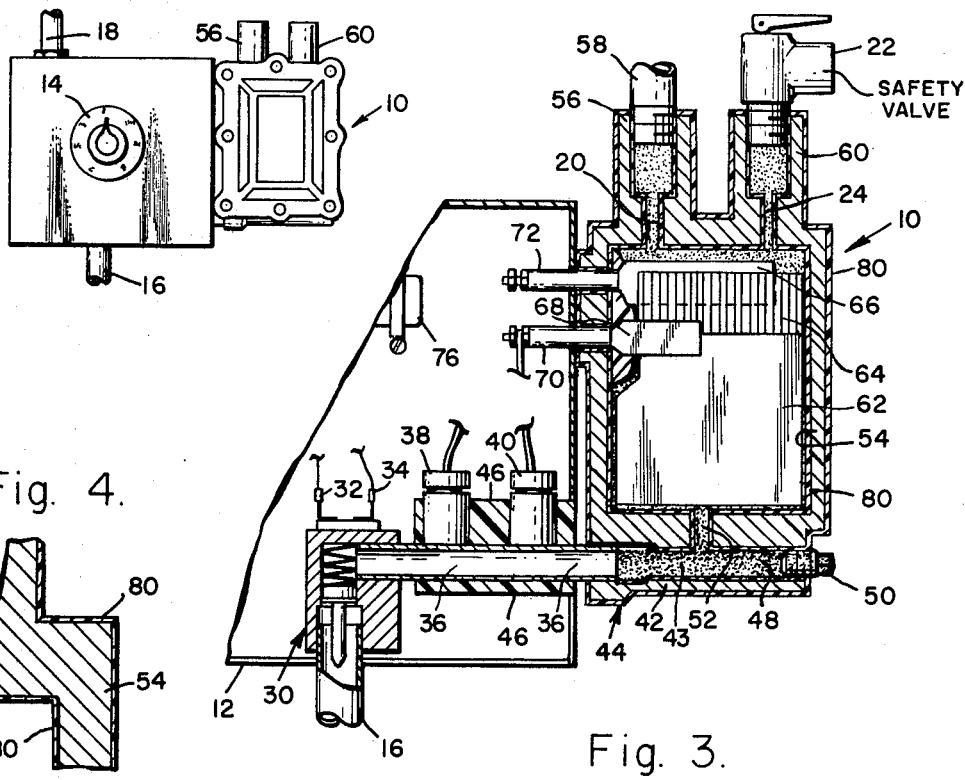

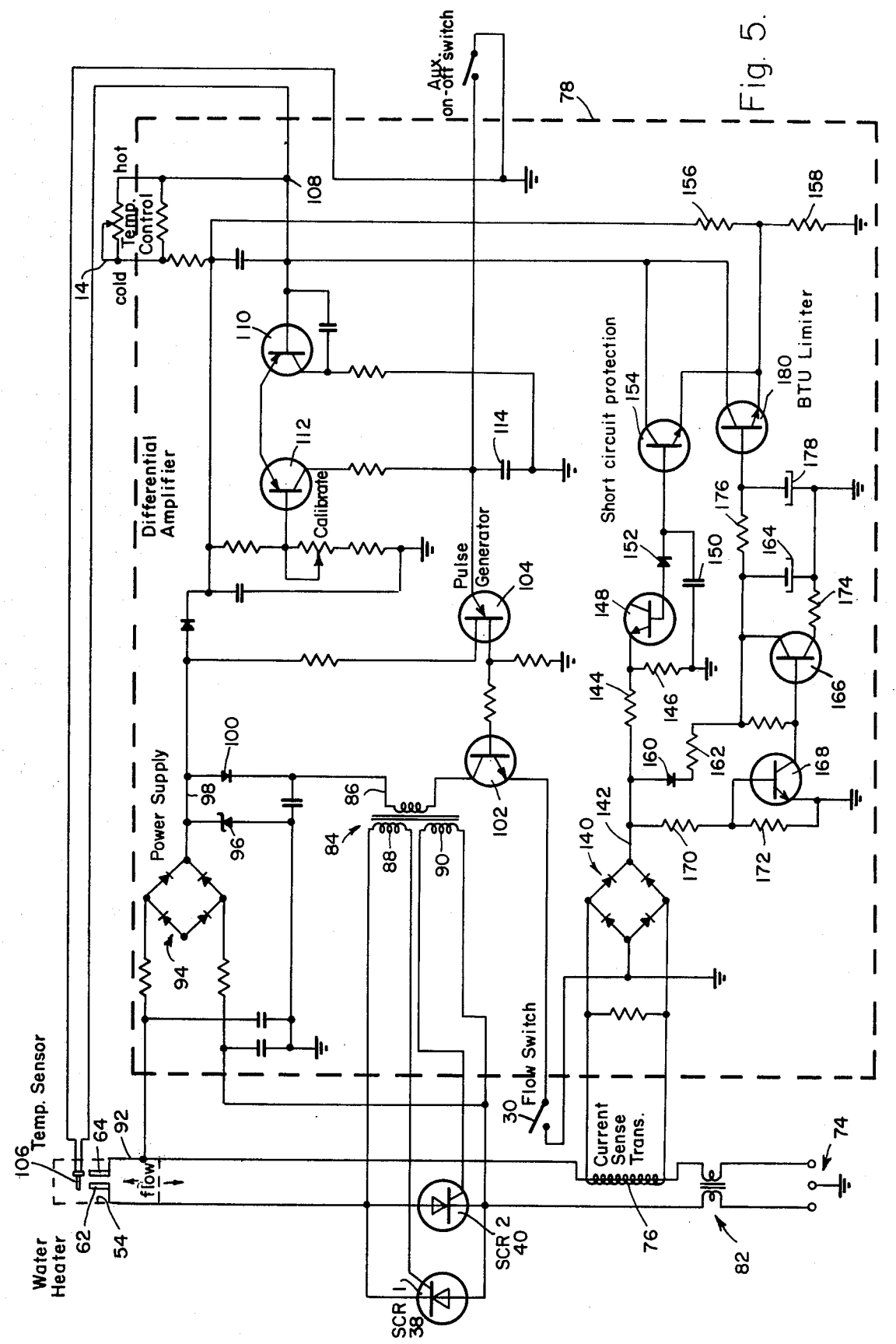

TEMPERATURE CONTROL SYSTEM FOR ELECTRIC FLUID HEATER

This application is a division of a copending application for ELECTRIC FLUID HEATER, Ser. No. 504,814 filed Sept. 10, 1974 now U.S. Pat. No. 3,983,559. That copending application is, in turn, a division of an application filed Aug. 3, 1973, Ser. No. 385,275, which issued on Sept. 30, 1975 as U.S. Pat. No. 3,909,588, By John A. Walker and Dimitri S. Dimitri, assigned to Datametrics Corporation.

BACKGROUND OF THE INVENTION

1. Field of the Invention

This invention relates to an electric fluid heater and, more particularly, to a demand-type electric heater in which the fluid is heated on demand only and the output temperature is maintained at a continuous temperature over wide ranges of flow rates.

The present invention has wide applicability for home installations as well as factory, laboratory and portable electric heaters for special purpose applications. The invention will be described in connection with a water heater having applicability for a home installation since many of the problems presented by a home hot water heater are solved by the instant invention. It is expressly understood, however, that the invention is not limited to the heating of water nor is it limited to home installation.

2. Description of the Prior Art

Instant electric water heaters have the potential benefit and advantage of eliminating the hot water storage tank usually associated with the conventional gas-fired or oil-fired or electric immersion type hot water heater systems. In the usual home hot water system a hot water tank of the order of 40 or 50 gallon capacity and usually glass lined contains an electric, gas or oil-fired heating mechanism which is preset to keep the stored water at a predetermined temperature and available for use by the occupants of the home.

The lowering of temperature of water within the boiler automatically causes the firing system to ignite (i.e., to begin applying heat to the water), thereby supplying more heat to maintain the temperature of the water within the preset limits. Similarly, as the water is used and fresh cold water is inserted into the tank, the water temperature is lowered and again the firing units are ignited for supplying heat to the water.

The instant hot water heaters do not contain a storage tank, but rather are connected intermediate the source of cold water and the ultimate user. A requirement for hot water is made by turning the hot water faucet into the "on" position, thereby allowing the cold water to pass through the heating chamber of the instant hot water system and out the hot water faucet for use by the ultimate user. Electric current is caused to pass through the water within the heating chamber of the electric hot water system, thereby instantly heating the water which is supplied to the user as demanded and hence, the term "demand system."

The instant hot water systems should be differentiated from the so-called electric immersion water heaters which normally contain resistive elements which are inserted into a water tank or similar container of water where the heat generated by the passage of current through the resistive element is transferred to the water in a heat transfer relationship. These electric immersion water heaters are conventionally used for home hot water heaters and are also used to heat small quantities of water, such as in portable containers or individual cup-sized containers for the making of beverages requiring hot water.

This invention is concerned with an instant fluid heating system in which the fluid is passed through a chamber containing electrodes and electric current is passed through the spaced-apart electrodes and through the fluid, thereby instantly heating the fluid for use by the ultimate consumer.

Instant hot water heaters of the type utilizing immersed current-conducting electrodes are known in the prior art and have been fully described in the Grupp U.S. Pat. No. 2,529,688 and in the Mamoulides U.S. Pat. No. 3,513,281.

The recognized problems associated with instant hot water heaters results from the fact that the electric current does not flow until the water is flowing through the heating chamber as evidenced by a demand for hot water. The rate of heat transfer between the electric current and the water is therefore very high, and it is imperative that automatic temperature control means be provided to regulate the water temperature during the heating process.

The problem is compounded by the fact that water varies in conductivity from location to location as a function of impurities and salts located within the water. So-called "hard water" contains concentrations of calcium, magnesium and iron in varying degrees, resulting in the hardness of the water. The parts per million (p.p.m.) of the dissolved minerals in the water is a measure of the hard water which is known to vary over a range of 10 p.p.m. to 1400 p.p.m.

In addition, the salinity of the water also varies the conductivity of the water, and it is known that the electrical conductivity of the water is proportional to the percentage of dissolved materials regardless of whether the water is of the hard type or soft type. The conductivity of water is generally expressed in terms of micro MHos per cubic centimeter ($\mu$mho/cm$^3$). Conductivity of municipal water varies enormously. Municipal water having conductivity as high as 1,660 $\mu$mho/cm$^3$ at 25° centigrade is known in the United States and even higher conductivities may exist.

The wide range of conductivity of the water has severely limited the development of instant demand electric hot water heater systems since the variations of the resistivity of the water of only one-half an ohm in a 220-volt system can vary the demand for current from 220 amperes to 440 amperes. In addition, conductive particles flowing through the water can cause instantaneous shorts capable of destroying the equipment and causing great damage.

The prior art has recognized these problems and has attempted to compensate for the changing conductivity of the water by utilizing mechanical devices for moving the spaced-apart electrodes within the heating chamber into a controllable relationship from each other in an attempt to maintain the same resistivity load between the electrodes. The Mamoulides patent mentioned above describes external mechanical means for physically varying the spacing between the spaced-apart electrodes.

It is envisioned that the operator would increase the spacing between the spaced-apart electrodes in those areas where the water is highly conductive and conversely reduce the spacing between the electrodes where the water has less conductivity. Unfortunately, such prior art devices cannot adapt to instantaneous changes or other temporary changes in the conductivity or hardness of the water.

In order to minimize the shock hazard associated with electric hot water heaters, it is necessary that the unit be grounded and that the leakage current between the electrodes and the ground connection be controlled within certain limits as determined by the Underwriters Laboratories. In the usual installation, the cold water pipes feeding the electric hot water heater are at ground potential and the water flowing past the electrodes in the heating chamber determine the leakage path between the electrodes and the ground. Changing conductivity of the water due to harness or immersed salts or any other reason will also affect the leakage current passing from the electrodes to ground, which current can create other dangerous conditions. The prior art has not disclosed how to handle the changing leakage current as a result of the changing conductivity of the fluid medium.

SUMMARY OF THE INVENTION

In the present invention there is disclosed means and apparatus for keeping the leakage current within limits for extreme conditions of high fluid conductivity. There is disclosed a heating chamber having spaced-apart electrically conductive electrodes for receiving the liquid to be heated. The electrodes are adapted to be connected to a source of controllable electric power for passing current through the liquid located within the heating chamber. The heating chamber has a plurality of ports, each comprising an enclosure having a predetermined volume displacement and configuration which communicate with the heating chamber at one end through a reduced aperture. In the preferred embodiment there is included an inlet port, an outlet port and a safety port adapted to be connected to a safety relief valve.

An electrically insulative covering is bonded to and provides electrically continuous insulation over all surfaces of the heating chamber and the interior surfaces of the plurality of ports, including all of their associated enclosures. The leakage path is determined by the individual connections made to each of the defined paths. For example, the inlet port enclosure, including its associated reduced aperture or orifice, connects the input cold water source to the heating chamber.

The cold water source is usually at ground potential. The leakage path from the electrode to the cold water pipe passes through the volume of water within the defined inlet enclosure. The volume and configuration of the enclosure and the aperture communicating the enclosure to the heating chamber is calculated to provide a volume of water having a given conductivity for limiting the leakage current from the electrode to the inlet pipe supplying fresh cold water.

Similarly, the output pipe and safety valve are each connected to a ground source, thereby establishing leakage paths of limiting conductance through each of the defined ports which include the defined enclosures. The total conductance of all leakage paths is therefore approximately limited to the sum of the conductances associated with the leakage paths through each port to ground, which paths are easily determinable since the volume and configuration of water within each of the enclosures associated with each port is precisely calculable.

In the present invention the electronic controller associated with the heating chamber provides a controllable electric power through the immersed electrodes in response to the temperature of the water leaving the heating chamber regardless of variation in conductivity of the water medium. The electronic controller is connected to the spaced-apart electrodes and controls the electrical power developed in said liquid between said electrodes by limiting the power to a predetermined maximum value regardless of changes in water conductivity or external water demands made on the system. In addition to the power limiting factor, there is also included a current limiting circuit for preventing current beyond a predetermined limit from passing between the immersed electrodes.

The present invention therefore limits both the power developed in the liquid medium and the total instantaneous current being drawn at any given time by the electrodes and is continuously responsive to instantaneous changes in the output liquid temperature as generated by the heating chamber.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE DRAWINGS

FIG. 1 is a plan view of the fluid heater and the electronic controller assembly;

FIG. 2 illustrates the fluid heater and electronic controller assembly with the covers removed;

FIG. 3 is a sectional view of FIG. 2;

FIG. 4 is a fragmentary view of the fluid heater illustrating the electric insulative covering;

FIG. 5 is a schematic diagram of the electronic controller; and

DESCRIPTION OF THE PREFERRED EMBODIMENTS

Figure 6:
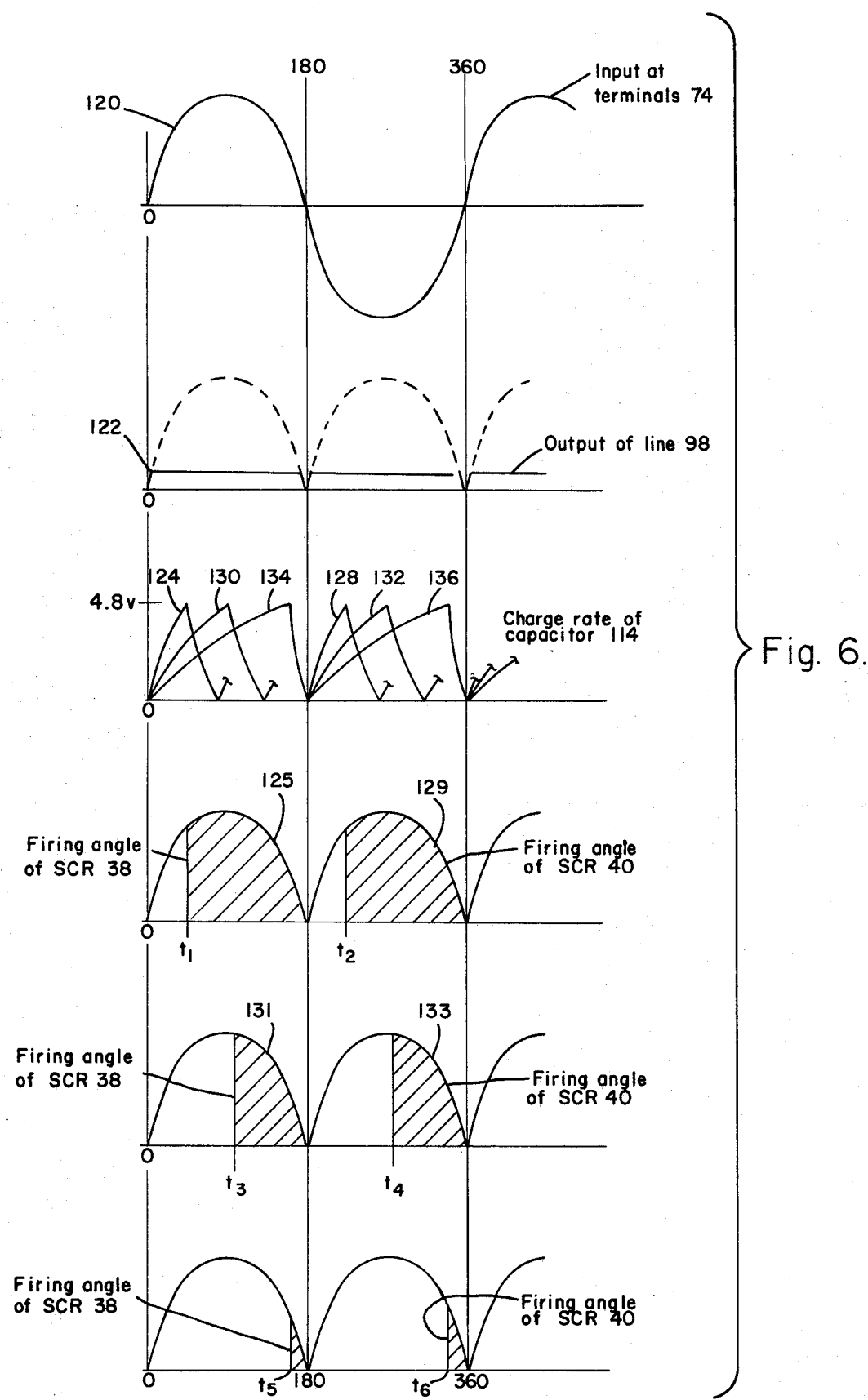
FIG. 6 is a series of waveforms illustrating the operation of the circuit shown in FIG. 5.

Referring now to FIG. 1, there is shown a fluid heater 10 and electronic controller 12 connected together as a unit and ready for installation wherever instant hot water is required. The electronic controller 12 contains a temperature control 14 that is normally used by the operator to preset the desired output temperature of the water.

A supply pipe 16 of cold water is connected to the lowermost portion of the electronic controller 12 which is connected internally with the water heater 10. In the preferred embodiment a 220-volt 60-hertz single-phase service is used to supply the energy for heating the water and also to operate the electronic controller 12. The source of electric power is fed through a power opening 18 located in the uppermost portion of the electronic controller 12.

The fluid heater 10 includes an exit port 20 for discharging the hot fluid formed within the fluid heater 10. A safety valve 22 is connected to a safety port 24 which also communicates with the water heater 10. The safety valve 22 is preset to open should the pressure within the water heater 10 exceed a given value.

A typical unit of the type illustrated in FIG. 1 for use in a residential or commercial dwelling will normally use a one-half inch tube or pipe 16 connected to the inlet source and approximately a ¾ inch diameter pipe connected to the output port 20. The inlet water supply pressure will normally not exceed 100 pounds per square inch as a maximum value, and the safety valve 22 will be preset to open at 125 pounds per square inch, thereby insuring that excessive pressures will not be developed within the water heater 10.

The AC power source may, for example, include a 220-volt service having a frequency of 60 cycles in a single-phase, three-wire system. Normally the neutral wire is grounded and the inlet supply as well as the exit pipe from port 20 should be grounded to earth ground in order to prevent and minimize any possible shock hazard. Opening any of the hot water faucets will automatically supply hot water at the temperature preset by the temperature control 14.

The normal residential unit will supply hot water at the preset temperature at any flow rate from 0.5 to 4.0 gallons per minute, provided the power required to heat the fluid to the selected temperature does not exceed a preselected power level. The embodiment electronic controller 12 described herein is set to automatically prevent excess power beyond a preselected level of 50,000 BTU/hr. from being developed in the water heater 10. Exceeding the 50,000 BTU limit will cause the outlet temperature to decrease as the flow rate is increased in a manner that will be more fully described in connection with the schematic diagram illustrated in FIG. 5.

FIG. 2 shows the fluid heater 10 and electronic controller with the front covers removed to expose the components. FIG. 3 is a sectional view of the fluid heater wherein portions of certain components have been broken away to show other components which lie behind them.

The cold liquid inlet pipe 16 is connected to a flow switch 30 which contains an electrical switch connected to terminals 32 and 34, which switch is caused to close whenever fluid is actually flowing through the flow switch 30. A short pipe section 36 connects the flow switch 30 with an inlet port enclosure 44 of the heating chamber 54. A pair of silicon controlled rectifiers (SCR's) 38 and 40 are cast into a block of epoxy 46 surrounding pipe section 36. The epoxy is of a type, known to the art, which is thermally conductive and electrically insulating. The block serves as a heat sink for the SCR's. The heat generated by the SCR's preheats the liquid thereby increasing the efficiency of the heater.

The pipe section 36 fits within the inlet port enclosure 44. An inlet port 43 leads to a passage 48 that is closed at the opposite end by a plug 50 and that communicates with heating chamber 54 through passage 52.

Exit port 20 is located at the uppermost end of the heating chamber 54. Exit port 20 has an enclosure 56 into which an output pipe 58 is attached.

Safety port 24 has an enclosure 60 to which a safety valve 22, which includes a short threaded section, is attached. Excess pressure developed within the heating chamber 54 will cause the safety valve 22 to open, thereby relieving the excess pressure.

A pair of plate-like electrodes 62 and 64 face each other within the heating chamber 54. The electrodes are mechanically held in place and separated from each other by suitable spacers (not shown).

Copper straps 68 and 66 are held in electrical contact with the non-opposing outer surfaces of the electrodes 62 and 64.

In FIG. 2 the front wall or cover of the enclosure of the heating chamber 54 and the suitable spacers have been removed to show the parts inside. In the sectional view of FIG. 3, the inner or opposing face of the rear electrode 64 is visible behind the outer surface of the nearer electrode 62 (shown as broken away in FIG. 3).

The source of electrical power from 18 is connected from terminals 74 to stand-off insulators 70 and 72 through the SCR's 38 and 40 and through a current sensing transformer 76 back to the terminals 74. The electronic control circuits for controlling the firing times of the SCR's 38 and 40 are contained on a panel board 78. Details of the individual connections for controlling the firing of the SCR's and for limiting the power to a maximum of 40,000 BTU/hr. will be more fully described in connection with the description of the schematic diagram illustrated in FIG. 5.

Referring now to FIG. 4, there is shown a fragmentary view of FIG. 3 which more fully illustrates the electrically insulative covering 80 which covers all interior surfaces and in the preferred embodiment completely covers the internal and external surfaces of the water heater 10. In the preferred embodiment, an epoxy coating is placed over all surface portions of the water heater 10, including the inlet enclosure 42, the inlet port 44, the channel 48, the plug 50, the central opening 52, the heating chamber 54, the exit port 20, the exit enclosures 56, the safety port 24 and the safety enclosure 60. In other words, all portions of the water heater 10, both inside and outside, are covered with the electrically insulative coating 80 which is made contiguous with and electrically continuous over the surfaces of the water heater.

The individual enclosures associated with each of the ports, such as inlet enclosure 42, exit enclosure 56 and safety enclosure 60, together with the electrically insulative coating 80, are all used as a means of controlling the leakage current from the individual electrodes 62 and 64 to earth ground.

The purpose of the electrically insulative coating 80 is to prevent any leakage current flowing directly from the electrodes 62 and 64 to any portion of the casing associated with the water heater 10. It should be remembered that the water heater 10 may be constructed of a conductive metal, such as aluminum. By coating all surfaces of the water heater 10 with the electrically insulative coating 80, any leakage current from the electrodes 62 and 64 must flow from the electrodes through the water confined in the port enclosures to either the input pipe source 16 which is at earth ground or to the exit pipe which is also at earth ground.

Those skilled in the art will quickly recognize that the safety valve 22, when locked in place within the safety enclosure 60 by means of pipe threads associated with the aforementioned parts, will invariably cut through the coating 80, thereby causing the safety valve 22 to physically contact the metal casing forming the water heater 10. In other words, the physical presence of the safety valve 22 will therefore present an additional leakage path from the individual electrodes 62 and 64 through the water which is in contact with the safety valve 22 back through the threads contacting the safety valve and to the metal casing of the water heater 10.

There is still a possibility of a fourth leakage path to ground which includes the plug 50 inserted into one end of the channel 48. Normally the plug 50 is also coated with the insulative coating 80 so that inserting and removing the plug 50 will not cause the water located within the chamber 48 to touch or be in contact with any exposed metal portion of the plug 50. However, it is envisioned that through use, the opening and closing of plug 50 may remove portions of the coating 80 thereby allowing water or fluid within the channel 48 to establish a fourth leakage path from the electrodes 62 and 64 through the water and through the exposed metal on the plug 50 back through the metal portions of the water heater 10 to earth ground. It will be recognized of course that plug 50 and its associated portions of channel 48 is not necessary, and may readily be eliminated in other embodiments of the invention.

In an electrode type water heater it is well known that when any of the electrodes are connected to a power supply that the leakage current will exist from the electrode to some point of common ground in view of the general practice of grounding the power supply to minimize potential shock hazards. These leakage currents exist because of the specific conductance of water which is usually measured and expressed in terms of micro-mhos per cubic centimeter.

In the present invention, the use of an insulated covering 80 over all portions of the water heater 10 causes the leakage current to be directed through the water confined by the enclosures in four given locations, namely the inlet portion, the exit portion, the safety valve portion and the plug portion. A control or limit of the magnitude of the leakage current is possible since the voltage of the power supply is known and the specific conductance of the fluid involved is determined for a worst case situation which has been determined to be potable water having a conductance of 1660 micro-mhos per cubic centimeter. The only unknown is the volume of water located between the electrodes and earth ground.

The individual enclosures such as the inlet enclosure 42 and the exit enclosure 56 together with the safety enclosure 60 including particularly the corresponding restricted apertures or orifices are constructed to hold predetermined volumes and geometric configurations of liquid. In general, the electrical resistance presented by any portion of a water volume to passage of current varies directly with length and inversely with area. Thus, it is evident that those portions of the individual enclosures which constitutes the narrow diameter extended restricted apertures or orifices presents relatively high resistance to the passage of leakage current and will be the primary determinant in limiting the leakage current to predetermined levels.

In the practical embodiment involving the use of electric water heaters, the Underwriters Laboratories have determined a maximum value for leakage current and that maximum value is used to predetermine the size and configuration of the individual enclosures and restrictive orifices associated with each of the ports feeding the heating chamber. In other words, for a given allowed leakage current, a given size enclosure is constructed to contain a given volume and configuration of liquid whose total conductance will be sufficiently low to so limit the leakage current from the electrodes to the common ground connection.

The end plug 50 does represent a potential fourth leakage path to a common ground, however, the resistance of the water path contained in the channel 48 is substantially greater than that in any of the other leakage paths, and since all leakage paths are in parallel, it can be easily determined that the addition of a fourth, high-resistance path, in parallel with three relatively low resistive paths, will not decrease the total resistivity of the overall system to any significant extent.

Referring now to FIG. 5, there is shown a schematic diagram illustrating the electronic components for controlling the flow of electrical power into the water to be heated. The 220-volt input line is fed to the field wiring terminals 74 which connect an optional radio frequency interference choke 82, the current sensing transformer 76 and the SCR's 38 and 40 in a circuit with the immersed electrodes 62 and 64. The defined circuit is normally open until either of the SCR's 38 and 40 are rendered conductive so as to allow current to pass between the electrodes 62 and 64 for the period of time that the SCR's conduct.

The individual SCR's 38 and 40 are controlled by a transformer 84 having a single primary winding 86 and a pair of identical secondary windings 88 and 90. With the primary windings 86 energized, identical voltages but of opposite polarity will be induced in secondary windings 88 and 90 which are connected to SCR's 38 and 40 respectively. For the first half cycle, SCR 38 will be energized and current will flow between the electrodes 62 and 64. For the second half cycle, SCR 40 will be energized and SCR 38 extinguished, thereby allowing current to flow between electrode 62 and 64.

It will be recognized that, for any complete cycle of the 60-cycle wave impressed on the primary windings 86, the individual SCR's will each be turned on for a selected portion of the one-half cycle. The process will repeat itself for each half cycle at which point the second SCR will be turned on and the first SCR will be extinguished as the impressed signal passes through zero. For any given sine wave, the positive going half cycle and the negative going half cycle will be substantially identical, thereby insuring that SCR 38 and 40 will be conducting for similar lengths of time thereby insuring a balanced current flow over a single cycle.

Control over the amount of heat generated in the fluid flowing between electrodes 62 and 64 is determined by the firing angle or time in each cycle that the individual SCR's are turned "on" and rendered conductive. In other words, with a small demand for heat, conduction of the SCR's will take place "late" in the cycle resulting in a short firing angle for each SCR. Conversely, a heavy demand for hot water will result in the individual SCR's firing "early" in the cycle, thereby insuring that the individual SCR's are on for a maximum time or large firing angle. The individual SCR's 38 and 40 are wired back to back, thereby allowing each SCR to be controlled for a given half cycle while the other SCR is extinguished.

Operating potential for the unit is achieved from the line voltage being fed to a full wave rectifier 94 having a zener diode 96 in the output for limiting the output voltage on the output line 98.

The primary winding 86 of transformer 84 is connected to the output line 98 through a diode 100, and through a through a transistor 102, through the flow switch 30 to ground. The transistor 102 is normally nonconductive with the base connected to one terminal of a normally nonconducting unijunction transistor 104. The unijunction transistor 104 and associated components form a pulse generator having a controllable frequency depending upon the heat requirements of the external circuit.

A high frequency oscillation of the pulse generator will cause unijunction 104 to fire early in the half cycle causing transistor 102 to fire early, whereas a lower frequency of oscillation of the pulse generator transistor 104 will cause the unijunction transistor 104 to fire late in the half cycle, resulting in transistor 102 firing late in the cycle. In the preferred embodiment, the pulse generator varies over a range including 1000 cycles per second.

The temperature of the water is measured at the exit port by means of a thermistor temperature sensor 106 which feeds the input line 108 or base circuit of a transistor 110 that is connected as a differential amplifier with transistor 12.

The base circuit of transistor 112 is connected across a dropping resistor and to a variable calibrating resistor to ground. The base circuit of transistor 110 on the other hand contains a resistive circuit including variable resistor 14 identified as the temperature control and the thermistor 106 to ground. During a balancing operation, the base circuits of the differential amplifiers are calibrated and balanced. A variation in the thermistor 106, indicating a need for more heat, will cause the input line 108 to the base of transistor 110 to vary from the balanced condition and cause transistor 110 to conduct less and force transistor 112 to conduct more.

In the normal condition, transistor 112 will be conducting during each part of the half cycle that heat is required, thereby charging capacitor 114 until the voltage on the capacitor reaches the breakdown potential of approximately 4.8 volts required for the unijunction 104 to fire. The varying impedance of transistor 112 causing the charging of capacitor 114 will therefore determine the time in the cycle when the unijunction transistor 104 fires. The rate of charging of capacitor 114 will determine the time in the cycle when transistor 102 fires.

With transistor 112 having a high impedance, capacitor 114 will charge at a relatively slow rate and the pulse rate will be substantially low and hence transistor 102 will fire late in the half cycle.

A review of the circuit will show that the individual SCR's 38 and 40 are each coupled through transformer 84 to be alternately turned on by the successive firings each half cycle of transistor 102 and individually turned off as the 60-cycle wave passes through zero. The firing angle or the time that the SCR's are turned on is a function of when in the corresponding half cycle transistor 102 is impulsed by the unijunction transistor 104.

The charging of capacitor 114 past the critical voltage of the unijunction transistor 104 will render the unijunction conductive and hence fire transistor 102; however, the rate of charge of capacitor 114 is determined by the impedance of transistor 112 comprising one-half of the differential amplifier. In other words, the rate of charge of the capacitor 114 is a function of the variable impedance of the transistor 112 and the size of the capacitor 114 and will vary exponentially in accordance with an RC charging circuit.

Transistor 112 is rendered conductive each half cycle of the 60-cycle input line and for each half cycle charges capacitor 114 at an exponential rate. The time required for for capacitor 114 to reach the threshold voltage of the unijunction transistor 104 is therefore a function of the impedance of transistor 112.

Hence it can be appreciated that whenever a small amount of heat is required transistor 112 will be conducting for a short period of time in each half cycle, and hence capacitor 114 will charge to the threshold voltage over a longer period of time as determined by the RC time constant. The longer it takes capacitor 114 to charge to the threshold voltage of the unijunction transistor 104, the smaller the firing angle, since the SCR's 38 and 40 will be turned on for a very short period of time before the 60-cycle wave passes through zero and extinguishes the conduction. The less time in the cycle that the SCR's 38 and 40 are conducting, the less power will flow through the electrodes 62 and 64, and hence the less heat will be generated in the fluid medium.

Consider now a situation where the voltage balance between temperature sensor 106 and resistor temperature control 14 indicates a low temperature condition requiring the generation of heat. In such a situation, the unbalance between the temperature sensor 106 and the resistor temperature control 14 in the base circuit of transistor 110 will present a voltage across line 108 and ground which causes the transistor 110 to be less conductive and thus allows transistor 112 to conduct more heavily, thereby presenting a lower impedance in the charging circuit of capacitor 114. The rate of charging of capacitor 114 is therefore increased allowing the capacitor 114 to reach the threshold potential of the unijunction transistor 104 at an earlier time which causes the firing of transistor 102 and results in the SCR's 38 and 40 firing for a longer period of time during each half cycle.

Capacitor 114 will discharge through the unijunction transistor 104 to ground until extinguished. Transistor 112 will attempt to again charge capacitor 114, which process will continue for the one-half cycle until zero voltage stops all conduction. During the one-half cycle and depending on how "hard" transistor 112 is driven into conduction, it is possible for capacitor 114 to charge and discharge through the unijunction transistor 104 at a varying rate of up to 1000 pulses per second.

At the higher pulse rate, which represents a high charging rate for the capacitor 114, the SCR's 38 and 40 are on for a longer period of time of the total half cycle. A lower pulse rate is achieved when transistor 112 is conducting at a lower rate, indicating a higher impedance, and hence the charging rate of the capacitor 114 takes a longer period of time. The number of discharges of capacitor 114 through the unijunction transistor 104 is less, thereby allowing the SCR's 38 and 40 to be on for a shorter period of time for each half cycle.

Under normal conditions, the base currents of the differential amplifiers 110 and 112 will be substantially equal and the transistors 110 and 112 will conduct "on" and "off" depending upon the slight variations as the base currents vary. A drop in the temperature of the liquid, as determined by the temperature sensor 106 and the pre-set temperature control 14, has the effect of unbalancing the base currents causing transistor 110 to conduct less and transistor 112 to conduct more.

Referring now to FIG. 6, there is shown a series of waveforms more fully illustrating how the firing angle is changed in response to the rate of charging of capacitor 114. Curve 120 illustrates a single cycle of the 60-cycle input appearing at the terminals 74. Curve 122 illustrates a substantially full wave rectified signal of the sine wave 120 which appears at the output of the full wave bridge rectifier 94 on output line 98.

In actual practice, the curve 122 is clipped and maintained at a substantial constant output level for each 180° due to the action of the zener diode 96. The changing impedance of transistor 112 changes the charging rate of capacitor 114, and as previously described, the charging rate of the capacitor is a function of the interaction of transistors 110 and 112 which are connected as differential amplifiers.

The firing potential of the unijunction transistor 104 in the preferred embodiment is 4.8 volts, which means that capacitor 114 will charge to 4.8 volts and then discharge to the threshold of the unijunction transistor 104, which action will occur for a plurality of pulses for the first 180°. Curve 124 illustrates a substantially high charging rate of capacitor 114, resulting from a heavy demand for current as evidenced by a low impedance driving source which causes a substantially fast charge rate for capacitor 114 through unijunction transistor 104.

Upon the very discharge of the unijunction transistor 104, transistor 102 is fired and, depending upon the polarity of the secondary windings 88 and 90 of transformer 84, the SCR 38 will fire at time T-1 as illustrated in Curve 125. SCR 38 will therefore be on for a long firing angle measured from T-1 to 180° at which point the voltage envelope passing through zero will extinguish the firing of the SCR.

The continuing charging and discharging of capacitor 114 for the period of time from 180° to 360° is shown by Curve 128, which is basically a repetition of Curve 124. Upon the Curve 128 reaching the threshold potential of 4.8 volts, the unijunction transistor 104 is fired at time T-2, as illustrated in Curve 129, thereby allowing SCR 40 to fire for a time measured from T-2 to 360°, which is substantially the same time as from T-1 to 180°.

In a similar manner, Curve 130 illustrates a slower charging rate for capacitor 114 for the first half cycle whereas Curve 132 illustrates a similar charging rate for the second one-half cycle. The firing angle for the SCR 38 as shown for the charging rate of Curve 130 is shown on Curve 131 as being measured by the time between T-3 and 180° for the firing angle of SCR 38. The firing angle for the SCR 40 is shown on Curve 133 as the firing angle between T-4 and 360°.

The heating of flowing water presents additional problems which results from the fact that minerals, salts and metal particles can exist in the water in spite of purfication techniques presently being used today. Conductive particles lodge between electrodes 62 and 64 present the possibility of generating short circuit currents when the SCR's 38 and 40 are rendered conductive.

These short circuit currents can generate hundreds of amperes for each half cycle that the SCR's conduct and have the potential possibilities of destroying the equipment if these currents are not controlled. A short circuit protection scheme is disclosed which detects a high pulse of current in excess of a predetermined amount, which current pulse is caused to control the potential across the base of transistor 110 so as to render transistor 110 conductive, thereby cutting off transistor 112 by presenting a high impedance and preventing capacitor 114 from being charged. With the capacitor 114 not charging, it is then impossible for either of the SCR's 38 or 40 to fire.

As shown in FIG. 6, a current sensing transformer 76 is located in circuit with the power lines feeding electrodes 62 and 64. Individual pulses of current will be detected by the transformer 76 and fed to a full wave bridge rectifier 140 which generates a DC potential output on line 142 which has a voltage amplitude bearing a direct relationship to the amplitude pulse of current detected by transformer 76. Line 142 feeds a voltage divider consisting of resistors 114 and 146 feeding a transistor 148 connected in circuit as a diode.

In the preferred embodiment, it was arbitrarily determined that a pulse of current in excess of approximately 300 amperes for one-half cycle would be the cutoff point for stopping the conduction of SCR's 38 and 40. The voltage divider of resistors 144 and 146 was selected to generate an amplitude of voltage sufficient to cause transistor 148 to conduct when the detected current was in excess of 300 amperes. Firing of transistor 148 causes a capacitor 150 to charge through diode 152 for the remainder of the one-half cycle. Capacitor 150 is also connected to the base of a transistor 154 and is prevented from discharging through transistor 148 by means of the back biased diode 152. The emitter of transistor 154 is connected to ground through a voltage divider circuit consisting of resistors 156 and 158 which are connected from ground to the output line 98.

The voltage divider of resistors 156 and 158 determine the threshold voltage needed to fire transistor 154. Whenever the input voltage appearing across the base of transistor 154 is greater than the threshold voltage, the transistor will fire and thereby place a low impedance path from the input line 108, which is the base connection for transistor 110 to ground. This action will immediately cause transistor 110 to conduct heavily, thereby effectively cutting off transistor 112 which prevents capacitor 114 from being charged.

The value of capacitor 150 is selected in combination with resistor 158 so that the discharge path for the capacitor 150 through the transistor 154 and through resistor 158 to ground will take approximately 30 seconds to maintain transistor 154 conducting. Transistor 110 will initially conduct heavily, thereby cutting off transistor 112 which prevents capacitor 114 from charging. Recognizing that the discharge of capacitor 150 is exponential, it will be recognized that the charging voltage on the base of transistor 154 will change the impedance of transistor 154 from an initially low value to a gradually higher value until the transistor is cut off. The increasing impedance of transistor 154 gradually restores the base of transistor 110 to the normal control of the temperature sensor 106.

Once transistor 154 stops conducting, the input line line 108 is no longer clamped to a low impedance source and the normal voltage divider current flowing through resistors 156 and 158 will increase, allowing the voltage across line 108 to ground to slowly allow transistor 112 to conduct to begin the charging of capacitor 114 and the ultimate returning of electrical power to the water heater by the conduction of SCR's 38 and 40.

Toward the end of the 30-second delay time it will be appreciated that transistor 112 will come on very slowly due to the normal differential action of transistors 110 and 112. The charging rate of capacitor 114 will therefore be taking place at a slow rate due to the initial high impedance of transistor 112, as shown in FIG. 6 and as measured by time T-5 to 180° and time T-6 to 360°. Should the shorting conditions still exist between the electrodes 62 and 64, the small firing angle for both SCR's 38 and 40 will prevent excessive current from passing through the line until the short is cleared.

In other words, the short circuit protecting scheme just described will initially detect the high surge of current caused by the short circuit and immediately result in a 30-second shutdown of power to the SCR's.

The returning power to the SCR's will take place initially over the short firing angle until the short circuit conditions are removed. After the initial surge of short circuit current, the normal action of controlling the charging rate of capacitor 114 will initially limit the current fed to the SCR's to a minimum value.

The circuit therefore is self-correcting in that the removal of the short circuit conditions allows the slow application of full power until normal conditions are achieved. Should the short circuit conditions continue to exist, the application of initial power is kept to a minimum and the current developed by the SCR's is kept to a minimum by maintaining a very short firing angle for each SCR until the condition is removed.

There is included a power limiter which effectively limits the power generated between electrodes 62 and 64 to a predetermined value in view of the size of the water chamber, the flow rate desired, and the available common electric service. In the preferred embodiment, a value of 50,000 BTU/hr. was selected as the maximum power that the unit would be allowed to impart into the water during the heating process. (This is approximately the amount of power that would be applied by a steady state current of 65 amperes at 225 volts.)

The BTU or power limiter to be described actually limits the amount of power that the system is allowed to generate in the water being heated and is effective regardless of changes in conductivity of the water medium or in instantaneous values or duration of the pulsed charging current.

The power limiter utilized the output voltage from the rectifier 140 as detected by the current sensing transformer 76. The output line 142 is connected through a diode 160 and a limiting resistor 162 to a capacitor 164. The charging rate of the capacitor 164 is accurately determined in response to the actual firing angles or time that the SCR's 38 and 40 are conducting. A transistor 166 is normally conducting and is connected across the capacitor 164, thereby allowing the capacitor to continuously discharge through transistor 166. The base of transistor 166 is connected to the collector terminal of a transistor 168, which is also connected across the capacitor 164. Transistor 168 is normally held in a nonconductive condition and has a base that is connected intermediate a voltage divider comprising resistors 170 and 172 that are connected between the operating potential on line 142 and ground.

Since transistor 166 is normally conducting, the capacitor 164 is incapable of being recharged until the transistor is held in a nonconducting condition by the action of transistor 168. The purpose of the circuit is to allow the capacitor 164 to charge only when the SCR's 38 and 40 are conducting and at the same time allow the charging voltage on the capacitor 164 to increase in response to an increase in the amplitude of current flowing through the SCR's 38 and 40. In other words, the charging of capacitor 164 will be a function not only of the amplitude of current flowing through the SCR's but also for the length of time that the SCR's are conducting, thereby making the ultimate charge on capacitor 164 representative of the actual power passed by the conducting SCR's 38 and 40.

The flow of current through the conducting SCR's 38 and 40 will be detected at the current sensing transformer 76 and presented as a voltage on output line 142 from the full wave rectifier 140. A voltage appearing across line 142 and ground appears across the voltage divider of resistors 170 and 172, thereby producing a voltage across the base of transistor 168 causing the transistor to conduct. The conduction of transistor 168 immediately causes transistor 166 to stop conducting, thereby allowing capacitor 164 to charge through diode 160 for the full firing angle that the individual SCR's 38 and 40 are conducting. The magnitude of the voltage appearing on line 142 will determine the charging potential. The time of charging will be determined by the length of the firing angle. At the end of each half cycle and for the off time, transistor 166 conducts and allows the capacitor 164 to discharge at a controlled rate as determined by resistors 174 located in the emitter path of transistor 166. The process then continues for each half cycle with transistor 166 conducting during the off time and discharging capacitor 164 and transistor 166 held nonconducting by the action of transistor 168 during the firing angle time of the SCR's 38 and 40, which allows capacitor 164 to charge.

The output of the capacitor 164 is fed to a decoupling network comprising resistor 176 and capacitor 178, which is connected to the base of a transistor 180. The emitter of 180 is connected across the voltage divider consisting of resistors 156 and 158 previously described in connection with the short circuit protection device. As described in connection with the operation of transistor 154, the threshold voltage across the voltage divider 158 is selected to keep transistor 180 in a normally nonconducting state. The circuit parameters are chosen so that the voltage appearing across capacitor 164 is representative of the power generated between electrodes 62 and 64, as evidenced by the value of current passing through the SCR's 38 and 40 and the time of firing angle that each of the SCR's are conducting. The value of voltage appearing across capacitor 164 is selected to be representative of the value 50,000 BTU's/hr., and when this predetermined value is reached, the base of transistor 180 will cause the transistor to begin to conduct, thereby establishing a shunt path line 108 (which is the base of differential amplifier transistor 110) through transistor 180 and resistor 158 to ground. This connection shifts the operating point of transistor 110 to produce a shorter firing angle and thereby limit the power to the 50,000 BTU/hr. level.

The filtering action of resistors 176 and capacitor 178 on the base of the transistor 180 maintains the transistor 180 in a conducting state for a period of time as determined by the voltage appearing across the input capacitor 164. As the power generated by the SCR's 38 and 40 decreases, the charge on the capacitor 164 will slowly dissipate through transistor 166 and resistor 174, thereby allowing the base voltage appearing on transistor 180 to slowly decrease. This action slowly changes the impedance of transistor 180 and gradually allows the input line 108 feeding the base of transistor 110 to approach a normal operating potential. This normalizing of the input voltage on the base of transistor 110 slowly allows transistor 112 to become conducting, which places a substantially high impedance in a charging circuit of capacitor 114 which slowly again allows the SCR's 38 and 40 to become conducting.

Currents in excess of 300 amperes will be detected by the short circuit protection circuit as previously described; however, these large currents will not unduly affect the power limiter circuit unless the firing angle is large and the total power is in excess of 50,000 BTU's/hr., as represented by the charging voltage on the capacitor 164.

A review of the circuit will show that the short circuit current protection system is independent of the power limiter and conversely that the power limiter is independent of the instantaneous current flowing at any one time since power is basically a function of the current flowing and the length of time that the current flows.

It is clear that the present invention is not limited to water, but can be used to heat any fluid that can be made to be electrically conductive.

Other embodiments of the present invention and modifications of the embodiments presented herein may be developed without departing from the essential characteristics thereof. Accordingly, the invention should be limited only by the scope of the claims appended below.

What is claimed as new is:

1. For use with an electric fluid heater having spaced-apart electrodes for applying electrical current to a fluid, and having a temperature sensor for sensing the temperature of the fluid, an electronic temperature control system comprising:
    (a) power control means connectable to the electrodes and operable for applying power to the electrodes, said power control means being responsive to application of a control signal thereto for controlling the electric power output in accordance with an electrical characteristic of the control signal; and,
    (b) control circuit means connected to said power control means and adapted to be connected to the temperature sensor, said control circuit means normally generating the control signal, said control circuit means being responsive to signals from the temperature sensor for altering the electrical characteristics of the control signal whenever the temperature of the fluid varies from a preset value, said control circuit means including means for sensing the electric current supplied to the electrodes, and further including a power limiting circuit, responsive to the sensed electric current for output generating a power detection signal whose magnitude represents the power being applied to the electrodes, said control circuit means being responsive to said power detection signal exceeding a preset value for altering the control signal to decrease the power applied to the electrodes.

2. The system defined by claim 1 in which said power control means controls the electric power applied to the electrodes by alternately blocking and passing current to the electrodes, said power control means controlling the relative durations of blockage and passage of current in accordance with the electric characteristic of the control signal.

3. The system defined by claim 1 in which said power limiting circuit produces a current signal representative of the current supplied to the electrodes and quasiintegrates the current signal to generate the power detection signal.

4. The system defined by claim 1 in which said control circuit means further comprises:
    a peak current circuit responsive to the sensed current for producing an inhibit signal of substantial duration whenever the current supplied to the electrodes exceeds a predetermined value, said control circuit means being responsive to the inhibit signal for inhibiting generation of the control signal during the duration of the inhibit signal.

5. The system defined by claim 1 in which said control circuit means further comprise:
    (a) a capacitor;
    (b) means for cyclically charging said capacitor at a variable charging rate representative of deviation of the temperature of the fluid from the preset value; and
    (c) means responsive in each charging cycle to the charge in said capacitor for generating the control signal.

6. The system defined by claim 5 in which said control circuit means is responsive to the power detection signal for reducing the charging rate of said capacitor.

7. The system defined by claim 5 in which said control circuit means further comprises means responsive to the sensed current for inhibiting charging of said capacitor for a substantial period of time whenever the current supplied to the electrodes exceeds a predetermined value.

* * * * *